United States Patent [19]
Murakami

[11] Patent Number: 4,761,775
[45] Date of Patent: Aug. 2, 1988

[54] OPTICAL DISC USING TRACKING AND CLOCKING PREPITS AND ADDRESS PREPITS BETWEEN ADJACENT ONES OF THE TRACKING AND CLOCKING PREPITS, AND AN OPTICAL APPARATUS USING SUCH A DISC

[75] Inventor: Hiroyasu Murakami, Yokohama, Japan

[73] Assignee: Tokyo Shibaura Denki Kabushiki Kaisha, Kawasaki, Japan

[21] Appl. No.: 8,118

[22] Filed: Jan. 23, 1987

Related U.S. Application Data

[63] Continuation of Ser. No. 722,761, Apr. 15, 1985, abandoned, which is a continuation of Ser. No. 388,173, Jun. 14, 1982, abandoned.

[30] Foreign Application Priority Data

Jun. 18, 1981 [JP] Japan ................................ 56-94427

[51] Int. Cl.[4] .............................................. G11B 7/00
[52] U.S. Cl. ...................................... 369/46; 369/275; 369/32
[58] Field of Search ............................. 369/32, 43–46, 369/275, 277, 278; 365/234; 358/342

[56] References Cited

U.S. PATENT DOCUMENTS

| | | |
|---|---|---|
| 3,673,412 | 6/1972 | Olson . |
| 4,142,409 | 2/1979 | Hedlund et al. ................ 365/234 X |
| 4,363,116 | 12/1982 | Kleuters et al. ................. 369/32 X |
| 4,364,118 | 12/1982 | Maeda et al. .......................... 369/44 |
| 4,375,088 | 2/1983 | de Hann et al. ................... 369/44 X |

FOREIGN PATENT DOCUMENTS

| | | |
|---|---|---|
| 19379 | 11/1980 | European Pat. Off. . |
| 21411 | 7/1981 | European Pat. Off. . |
| 2420182 | 10/1979 | France . |
| 2504301 | 10/1982 | France . |
| 56-22227 | 3/1981 | Japan . |
| 111835 | 7/1982 | Japan . |
| 57-181429 | 11/1982 | Japan . |

OTHER PUBLICATIONS

Neues Aus Der Technik, No. 5, Oct. 79, Wurzburg (DE), Article No. 542, Synchronization.
Translation only of JP 56-22227.

*Primary Examiner*—Aristotelis M. Psitos
*Attorney, Agent, or Firm*—Cushman, Darby & Cushman

[57] ABSTRACT

An optical disc and an apparatus using it. Prepits are preformed on a surface of the disc at a pitch to facilitate tracking thereof. The prepits are used for both tracking and clock generation. A processed tracking signal and a processed clocking signal are generated from signals generated solely from the preformed prepits.

8 Claims, 5 Drawing Sheets

OPTICAL DISC USING TRACKING AND CLOCKING PREPITS AND ADDRESS PREPITS BETWEEN ADJACENT ONES OF THE TRACKING AND CLOCKING PREPITS, AND AN OPTICAL APPARATUS USING SUCH A DISC

This is a continuation of application Ser. No. 722,761, filed Apr. 15, 1985, which was abandoned upon the filing hereof, which is a continuation of applicaiton Ser. No. 388,173, filed June 14, 1982, which was abandoned upon the filing hereof.

BACKGROUND OF THE INVENTION

The present invention relates to an optical disc and an optical disc apparatus for using the same.

An optical disc is a medium on which data can be recorded at a high density. Data are recorded by radiating the disc with a laser beam. An optical disc apparatus records data on such a disc and reads the recorded data from the disc. The optical disc and the optical disc apparatus are used for recording and reading a great amount of video data.

Optical discs are shipped from the factory with no data recorded on them. They each have tracking pregrooves and prepits—all cut in a recording layer. The prepits present the serial numbers of tracks. Data are recorded on the disc in the following way.

The optical disc is rotated. While the disc is rotating, an optical head is moved in the radial direction of the disc until it reaches a desired tracking pregroove. The optical head therefore traces the tracking pregroove. Data are supplied to the optical head. The optical head emits a recording laser beam which is modulated according to the data. As the beam is radiated on the disc, data pits corresponding to the data are cut in the recording layer of the disc. At the same time, clock pits are cut in the recording layer.

The recorded data are read in the following way. The disc is rotated, and the optical head is moved in the radial direction of the disc until it reaches the tracking pregroove. A reading laser beam is then emitted while the optical head is tracing the pregroove. The data pits and the clock pits made in the recording layer are scanned with the laser beam, thereby reading the data from the optical disc.

With the conventional optical disc and the apparatus both mentioned above it is necessary to cut tracking pregrooves and clock pits. This limits that area of the recording layer in which data pits may be cut. It follows that the recording density is limited. Further, since the pregrooves have a depth and a width and the prepits have another depth and another width, the process of cutting them is rather complicated.

SUMMARY OF THE INVENTION

It is an object of the present invention to provide an optical disc which allows an improvement in the recording density by preformation of pits for both tracking and clock generation, and also to provide an optical disc apparatus which is simple in construction and which is capable of fast tracking control with high precision.

According to an aspect of the present invention, there are provided an optical disc wherein a plurality of pits (which also facilitate generation of clock signals) are spirally or concentrically preformed at a pitch such that tracking may be performed; and an optical disc apparatus, which records data between the prepits on the optical disc and reads out the data by tracking and clock generation on the basis of the prepits.

According to another aspect of the present invention, there are also provided an optical disc wherein prepits for address codes are formed in addition to the prepits for both tracking and clock generation; and an optical disc apparatus which records and reproduces data on and from the optical disc.

DETAILED DESCRIPTION OF THE PREFERRED EMBODIMENTS

Figure 1:
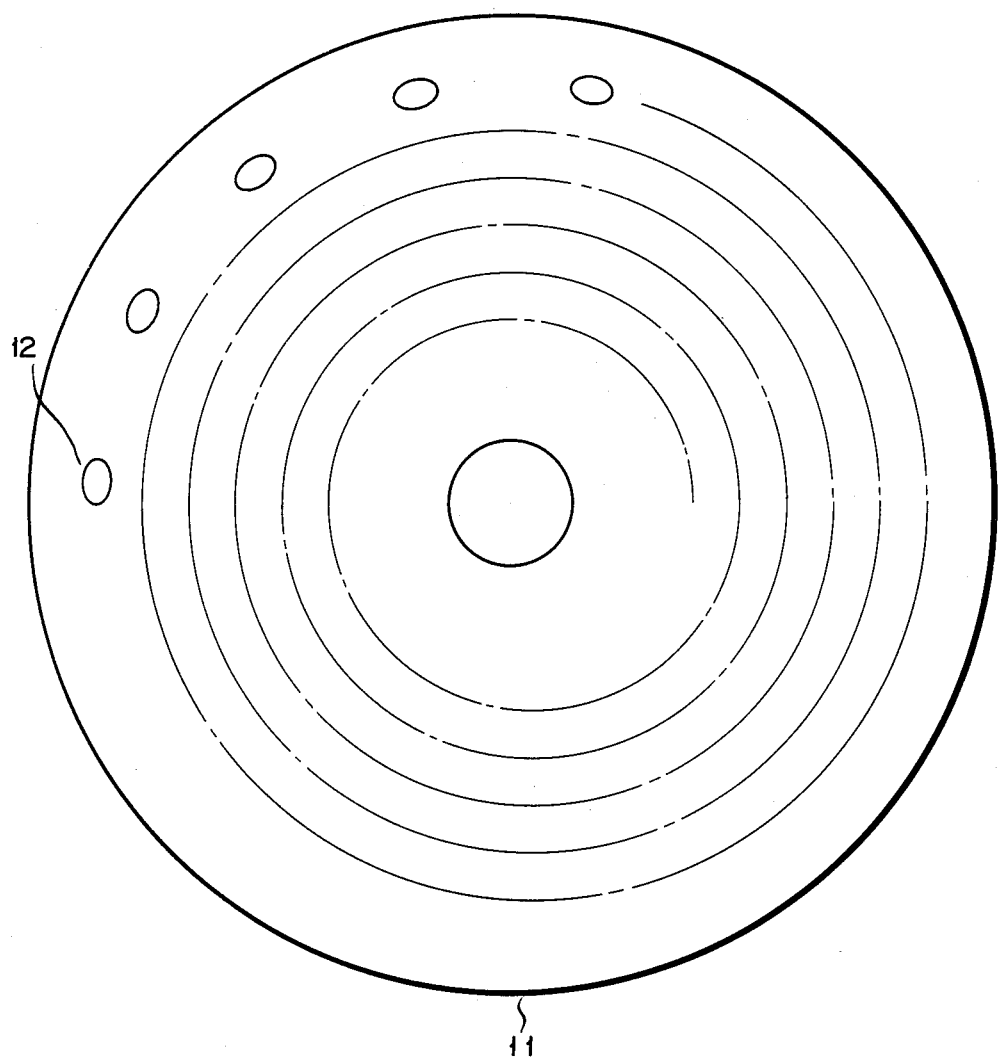
FIG. 1 is a plan view of an optical disc according to an embodiment of the present invention.

In an optical disc 11 shown in FIG. 1, pits 12 are spirally preformed on the optical disc 11 at a constant pitch P. The pitch P is set to allow tracking of adjacent pits by a tracking device so that the prepits function as tracking pits as well as clock pits. Data pits are recorded between these prepits 12. Optical discs permitting such in between recording are known as add-on type.

Figure 2:
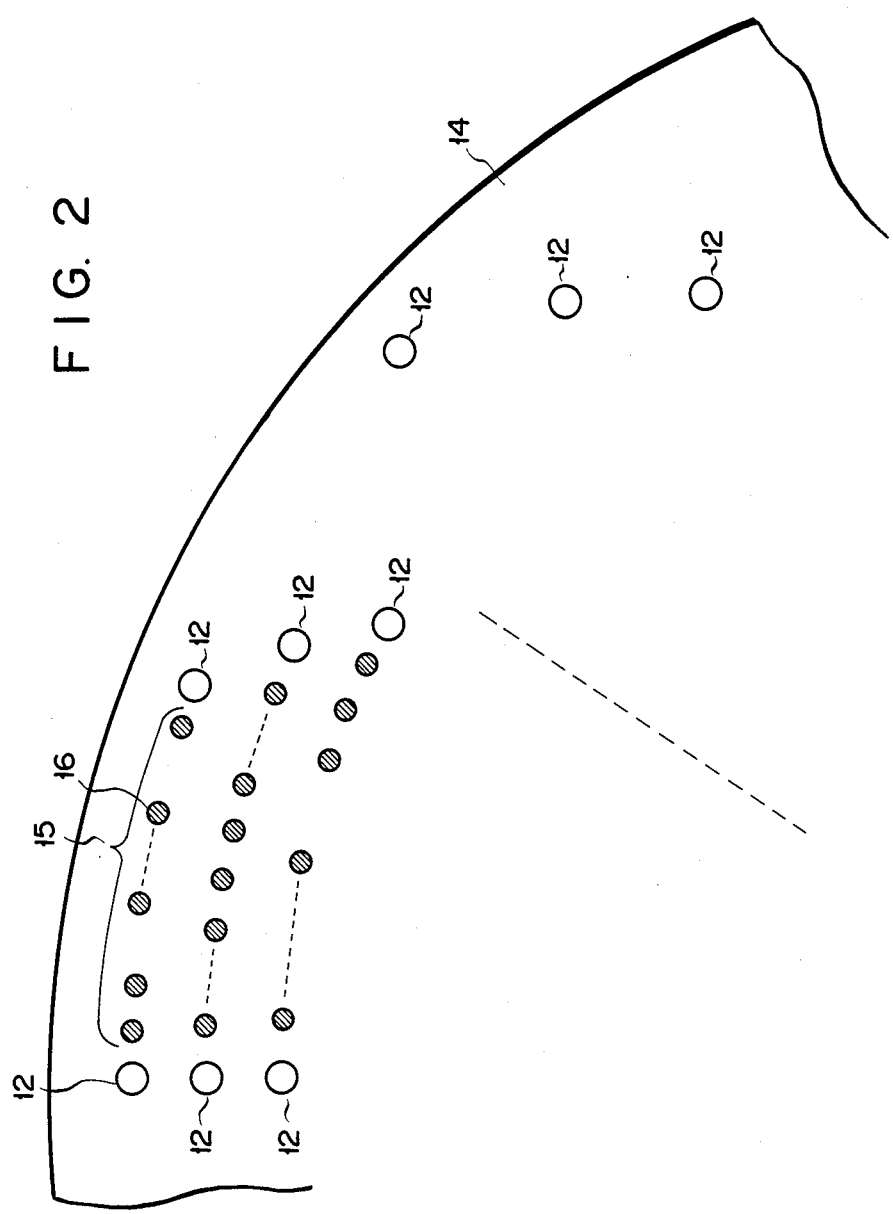
FIG. 2 is a partial plan view of an optical disc according to another embodiment of the present invention.

In the optical disc 11 shown in FIG. 1, only the prepits 12 for tracking and clock generation are formed but in an optical disc 14 shown in FIG. 2, address prepits 16 representing address data 15 such as track numbers are formed in addition to the prepits 12. The address data 15 is represented by a maximum of 24 prepits; the address data 15 is composed of 24 bits or three bytes. These prepits 12 and the address prepits 16 may be formed in the same process at the factory. An optical disc apparatus forms data pits on the optical disc 14 on which the prepits 12 and the address prepits 16 are formed.

Figure 3:
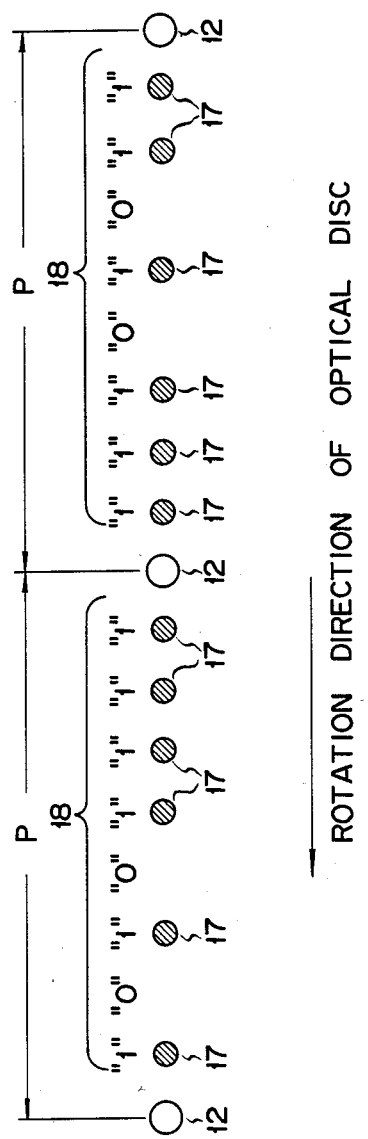
FIG. 3 is a view showing the binary data format represented by pits.

Recording of data on the optical disc 11 or 14 will first be described. For this purpose, the laser beam radiated on the optical disc 11 is switched to a recording laser beam or reproducing laser beam according to a recording mode or reproducing mode. In the recording mode, the prepits 12 are detected, whereby tracking is performed. With reference to the detection signal of the prepits 12, synchronizing clocks of a period corresponding to 1/9 of the pitch of the prepits 12 are generated. In synchronism with the synchronizing clocks generated, the laser beam is switched from the reproducing laser beam to the recording laser beam. Then, a maximum of eight data pits 17 are formed between the prepits 12, in correspondence with recording data 18, as shown in FIG. 3. In recording data, the presence of the data pit 17 is represented by logic level "1", while the absence of the data pit 17 is represented by logic level "0". Thus, data in FIG. 3 may be represented as "10101111" and "11101011".

In order to reproduce the data from the optical disc 14, the prepits 12 and the address pits 16 or the data pits 17 are detected by the reproducing laser beam. Tracking is performed in accordance with the obtained detection signals. Signals corresponding to the address pits 16 or data pits 17 are separated as clock signals from the detection signals. Synchronizing clocks corresponding to the prepits 12 are produced from the separated clock signals. In synchronism with these synchronizing clocks, the recording data 18 represented by the presence or absence of the data pits 17 is extracted from the detection signals.

In either recording or reproduction of data on or from an optical disc as described above, the optical head is first moved at high speed to a rough target position of the optical disc 11 or 14. Thereafter, the prepit 12 or 16 at the target position is traced by the reproducing laser beam which reads the address data 15 and decodes it. When the decoded address data coincides with the desired address data, data is recorded on or reproduced from a track corresponding to the decoded address data.

Figure 4:
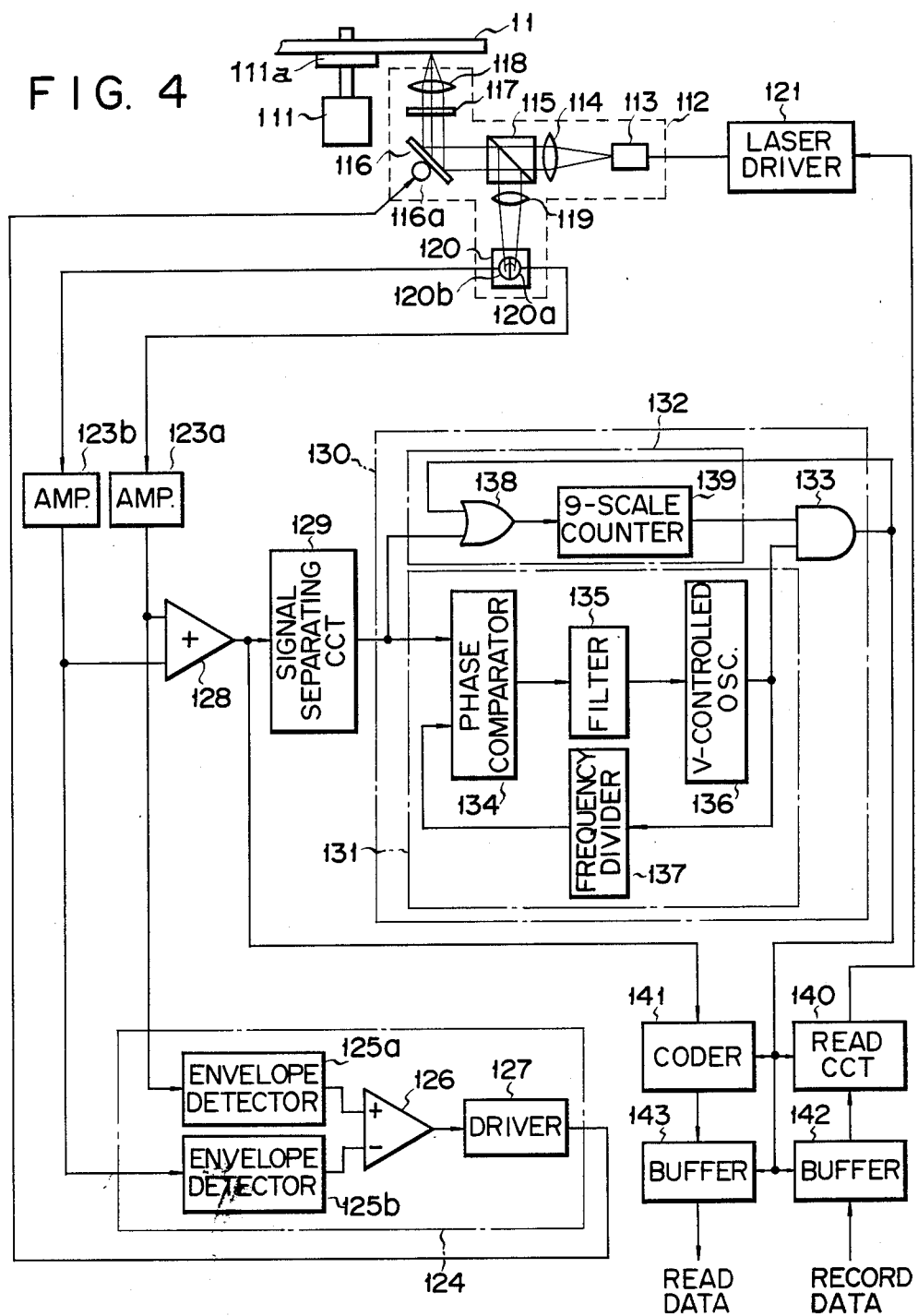
FIG. 4 is a circuit diagram of an optical disc apparatus using the optical disc shown in FIG. 2.

The recording, reproduction and access modes will be described with reference to FIG. 4. Referring to FIG. 4, the optical disc 11 is placed on a turntable 111a of a motor 111. An optical head 112 is movable in the radial direction of the optical disc 11. The optical head 112 has a semiconductor laser oscillator 113, at the output end of which are arranged a collimator lens 114 and a beam splitter 115 in the order named. A galvanomirror 116 is arranged on the straight optical path from the beam splitter 115. A condenser lens 119 and an optical sensor 120 are arranged in the order named on the optical axis extending at a right angle from the beam splitter 115. The galvanomirror 116 opposes the optical disc 11 through a $\lambda/4$ plate 117 and an objective lens 118.

The input end of the semiconductor laser oscillator 113 of the optical head 112 is connected to the output end of a laser oscillator driver 121. Photoelectric elements 120a and 120b of the optical sensor 120 are respectively connected to the input ends of preamplifiers 123a and 123b. The output ends of the preamplifiers 123a and 123b are respectively connected to the input ends of envelope detectors 125a and 125b of a tracking servo unit 124. The output ends of the envelope detectors 125a and 125b are connected to the input ends of a comparator 126, the output end of which is connected to the input end of a galvanomirror driver 127. The output end of the galvanomirror driver 127 is connected to a galvanomirror drive coil 116a. The output ends of the preamplifiers 123a and 123b are also connected to the input end of an analog adder 128, the output end of which is connected to the input end of a signal separating circuit 129. The output end of the signal separating circuit 129 is connected to one input end of a phase comparator 134 of a PLL (Phase Locked Loop) circuit 131 of a synchronizing clock producing circuit 130 and to one input end of an OR gate 138 of a region signal generator 132. The output end of the phase comparator 134 is connected to a voltage controlled oscillator 136 through a filter 135. The output end of the voltage controlled oscillator 136 is connected to one input end of an AND gate 133 and to the input end of a frequency divider 137. The output end of the frequency divider 137 is connected to the other input end of the phase comparator 134. The output end of the OR gate 138 of the region signal generator 132 is connected to the input end of a novenary counter (9-scale counter) 139. The novenary counter 139 produces a signal of logic level "0" when the count thereof is 0 and produces a signal of logic level "1" when the count thereof is 1 to 8. The output end of the novenary counter 139 is connected to the other input end of the AND gate 133. The output end of the AND gate 133 is connected to the other input end of the OR gate 138; and to synchronizing clock input ends of a reading circuit 140, a binary coder 141, a recording data buffer memory 142, and a production data buffer memory 143. The output end of the analog adder 128 is connected to the input end of the binary coder 141.

Figure 5:
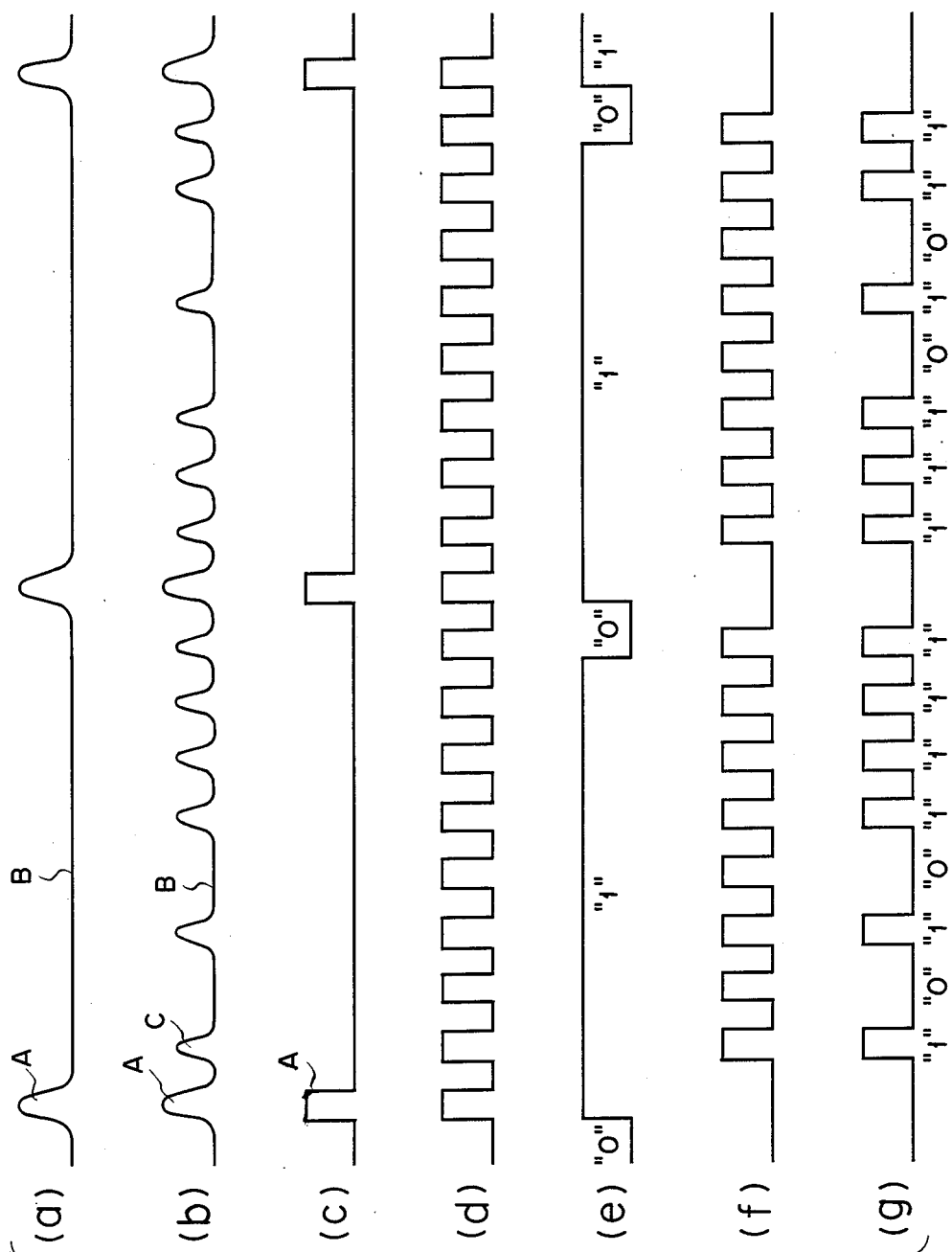
FIG. 5(a-g) shows the timing charts for explaining the mode of operation of the optical disc apparatus shown in FIG. 4.

In order to record data on the optical disc 11 by the optical disc apparatus described above, the optical head 112 is moved to a desired position on the optical disc 11, and the semiconductor laser oscillator 113 is driven. The reproducing laser beam radiated from the semiconductor laser oscillator 113 is collimated by the collimator lens 114 and becomes incident on the galvanomirror 116 through the beam splitter 115. The reproducing laser beam reflected by the galvanomirror 116 becomes incident on the $\lambda/4$ plate 117, and the reproducing laser beam emerging from the $\lambda/4$ plate 117 is focused on the objective disc 11 by the objective lens 118. Since the optical disc 11 is being rotated at a predetermined speed, the reproducing laser beam scans the optical disc 11. The reproducing laser beam reflected by the optical disc 11 is reflected toward the beam splitter 115 by the galvanomirror 116 through the $\lambda/4$ plate 117. The reproducing laser beams split by the beam splitter 115 are collimated on the optical sensor 120 by the condenser lens 119. The photoelectric elements 120a and 120b of the optical sensor 120 produce photoelectric signals, whose levels correspond to the amounts of halves of the beam spot landing on the elements 120a and 120b, respectively. The photoelectric signals corresponding to the half spot components are amplified by the preamplifiers 123a and 123b to provide amplified photoelectric signals a (only one signal is shown in FIG. 5) are input to the envelope detectors 125a and 125b. Signal components A of the amplified photoelectric signals a correspond to the reflected light from the prepits 12, while signal components B thereof correspond to the reflected light from the surface of the optical disc 11. The envelope detectors 125a and 125b detect the envelopes of the amplified photoelectric signals a. The output signals from the envelope detectors 125a and 125b are compared by the comparator 126, which produces a difference signal corresponding to the tracking error. When this difference signal is supplied to the galvanomirror driver 127, the galvanomirror drive coil 116a is driven, and tracking is performed so that the reproducing laser beam may correctly trace the track.

The amplified photoelectric signals a supplied to the analog adder 128 are added and an output signal from the analog adder 128 is supplied to the signal separating circuit 129. The signal separating circuit 129 separates the signals corresponding to the prepits 12, i.e., the signal components A from the output signal from the analog adder 128, and supplies a clock pit signal c to the synchronizing signal producing circuit 130. In the synchronizing signal producing circuit 130, the PLL circuit 131 outputs clock signals d of a period which is 1/9 of the period of the adjacent signal components A. In the PLL circuit 131, the comparator 134 compares the phase of the clock pit signal c with that of the signal obtained by frequency-division by the frequency divider 137 of the output signal from the voltage controlled oscillator 136. A signal corresponding to the phase difference from the comparator 134 is supplied to the voltage controlled oscillator 136. The voltage controlled oscillator 136 in the PLL circuit 131 outputs the clock signal c. When the clock pit signal c is supplied to the novenary counter 139, the counter 139 is counted up from zero and outputs a counter signal e of logic level "1". In response to this signal, the AND circuit 133 allows passage of the clock pulses of the clock signal d. The clock pulses which have passed through the AND circuit 133 are counted by the counter 139. When the count of the novenary counter is cleared to zero after counting 8 clock pulses, the counter signal e from the novenary counter 139 goes to logic level "0" again to close the AND gate 133. The AND gate 133 then outputs a signal f. The signal f includes 8 clock pulses which are obtained by equally dividing the period of the signal components A.

When a recording command is supplied to the optical disc apparatus in the status as described above, the reading circuit 140 reads the recording data from the recording data buffer memory 142 in units of bits in synchronism with the clock pulses of the signal f and the readout recording data is supplied to the laser oscillator driver 121. In response to the recording data, the laser oscillator driver 121 switches the reproducing laser beam to the recording laser beam. A recording laser beam modulated according to the recording data is output from the semiconductor laser oscillator 113 and forms the data pits 17 between the prepits 12. During data recording, the reproducing laser beam is switched to the recording laser beam when the recording data is at logic level "1", and the recording laser beam is switched to the reproducing laser beam when the recording data is at logic level "0". The format of the recording data 18 recorded on the optical disc 11 is shown in FIG. 3.

Reproduction of the recording data from the optical disc will now be described. As in the case of recording, the optical head 112 is moved to a predetermined position on the optical disc 11 and the reproducing laser beam is radiated on the optical disc 11. Tracking control as in the case of recording is performed in accordance with the reproduced signals from the reflected light of the reproducing laser beam. The synchronizing signal producing circuit 130 produces a synchronizing signal f. A signal corresponding to the prepits 12 (e.g., signal components A) and the data pits 17 (e.g., signal components c) is output from the analog adder 128. When a reproduction command is supplied to the optical disc apparatus in this state, the binary coder 141 binary-encodes the signal b from the analog adder 128 into a binary signal g in synchronism with the synchronizing signal f. The binary signal g is stored in the reproduction data buffer memory 143. The data (e.g., signal components c), i.e., the signal g stored in the reproduction data buffer memory 143 is supplied to an electrographic printer (not shown) and is printed out in the form of an image or supplied to a display unit to be displayed in the form of an image.

In the embodiment described above, data is recorded on and reproduced from an optical disc 11 which does not record address data. However, if the optical disc 14 with the address prepits 16 is used, the address data 15 is retrieved first for recording or reproduction. Then, the optical head 112 is moved to the position of the designated address data 15. In this case, the optical head 112 is moved at a high speed to the vicinity of the designated address data position. For example, the optical disc 14 is radially divided into a plurality of sections and block-addressed. The optical head 112 is moved at a high speed to the block address including the designated address. The designated address is searched within the block address. The address data reproduced by the address retrieval is converted into the binary data by the binary coder 141 in synchronism with the synchronizing signal and the binary data is stored in the reproduction data buffer memory 143. The address data stored in the reproduction data buffer memory 143 is compared with the predesignated address data, and recording or reproduction of data is performed on or from a track corresponding to the coinciding address data.

According to the present invention, pits for tracking and clock generation are preformed spirally or concentrically on an optical disc at a factory. Tracking as well as clock generation can be performed by tracking these prepits. Since the address data such as track numbers is prerecorded between the prepits, high-speed random access may be performed, and fast recording and reproduction of data on or from a predetermined track may be performed.

What is claimed is:

1. An optical disc apparatus which uses a reproducing and recording laser beam on an optical disc of the type having a disc member with a surface with no pregroove thereon, first prepits being preformed on said surface and arranged along a helical path at a predetermined pitch of said prepits, by which tracking of adjacent pits and clock generation are allowed at least in a data recording mode, said surface further having a plurality of groups of succcessively arranged second prepits, each said group formed first adjacent ones of said first prepits and constituting a header area which represents address data used for designating a position for recording data, said surface being preformed with said first and second prepits, and being adapted for forming data pits to be recorded on said surface between other adjacent ones of the first prepits arranged after the second prepits, said other adjacent ones being first prepits which do not have any of said groups of second prepits therebetween, comprising:

optical head means for selectively scanning the reproducing and recording laser beam onto said preformed prepits of said disc to obtain tracking and clocking information therefrom, and for generating a tracking signal and a clocking signal solely from said information obtained from said preformed prepits;

processed tracking signal producing means for producing a processed tracking signal from said tracking and clocking signals generated by said optical head means;

tracking controlling means, responsive to said processed tracking signal, for controlling tracking of said optical head means;

means for producing a precessed clocking signal from said tracking and clocking signals generated by said optical head means; and means for recording and reproducing multiple data pits between said other adjacent ones of said first prepits in synchronism with said processed clocking signal.

2. An apparatus according to claim 1, wherein
   said optical head means comprises means for generating said tracking and clocking signals as two signal components respectively corresponding to spot components obtained by dividing a spot of said reproducing laser beam into halves; and
   said processed tracking signal producing means comprises envelope detector means for respectively detecting envelopes of said signal components, means for comparing the detected envelopes and for generating a difference signal from said comparison, and means for converting said difference signal into said processed tracking signal.

3. An apparatus according to claim 1, wherein said processed clocking signal means comprises:
   means for extracting signal components corresponding to said prepits from said tracking and clocking signals,
   means for generating clock pulses by dividing a period of said extracted signal components into a plurality of equal periods,
   a counter having a counter scale output equal to said equal period, and
   gate means for controlling output of said clock pulses in accordance with the output from said counter.

4. A disc adapted for optically recording information thereon and playing back information therefrom, comprising:
   a disc member having a surface and no pregroove;
   a plurality of first prepits being helically preformed on said surface and arranged individually at a predetermined prepit pitch, and from which tracking of adjacent pits and clock generation are performed at least in a data recording mode;
   a plurality of groups of successively arranged second prepits, each said group formed between first adjacent pairs of said first prepits, wherein said second prepits constitute a header including address data used for designating a position for recording data, said surface being preformed with said first and second prepits, and adapted for forming data pits to be recorded between second adjacent pairs of said first prepits arranged after said header, said second adjacent pairs of said first prepits being pairs which do not have said groups of second prepits therebetween.

5. A disc according to claim 4, wherein said first prepits extend spirally on said surface so that a continuous array of prepits is formed.

6. A disc according to claim 4, wherein said first prepits extend concentrically on said surface so that said next prepit is adjacent to said each prepit in one of a tangential and a radial direction.

7. A disc according to claim 4, wherein said addresses of data represent a track number of an area of said surface.

8. A disc for receiving optically recorded information thereon and playing back information therefrom, comprising:
   a disc member having a surface and no pregroove;
   a plurality of first prepits helically preformed on said surface at a predetermined pitch by which, at least in a data recording mode, tracking and clock generation can be performed;
   a plurality of groups of consecutively arranged second prepits formed between first adjacent ones of said first prepits and constituting a header including address data used for designating a position for recording data, said surface being pre-formed with said first and second prepits; and
   a plurality of data recording areas, adapted for receiving data pits to be recorded therein, each said data recording area located between second adjacent ones of said first prepits arranged after said header, said second adjacent ones of said prepits being ones between which said groups are not formed.

* * * * *